US007782885B1

(12) United States Patent
Sabato et al.

(10) Patent No.: US 7,782,885 B1
(45) Date of Patent: Aug. 24, 2010

(54) SYSTEM AND METHOD FOR QUEUE MANAGEMENT USING QUEUE SETS

(75) Inventors: Simon Sabato, Sunnyvale, CA (US); Harish R. Devanagondi, Saratoga, CA (US); You-Wen Yi, Milpitas, CA (US); Harish P. Belur, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 965 days.

(21) Appl. No.: 10/734,081

(22) Filed: Dec. 10, 2003

Related U.S. Application Data

(60) Provisional application No. 60/432,518, filed on Dec. 10, 2002.

(51) Int. Cl.
*H04L 12/28* (2006.01)
*H04L 12/56* (2006.01)

(52) U.S. Cl. .................. 370/412; 370/419; 370/389

(58) Field of Classification Search ............... 370/412, 370/232, 230.1, 395.4, 465, 535
See application file for complete search history.

(56) References Cited

U.S. PATENT DOCUMENTS 5,463,620 A * 10/1995 Sriram ..................... 370/412
5,555,396 A * 9/1996 Alferness et al. ........... 711/147

(Continued)

OTHER PUBLICATIONS

Recommendations on Queue Management and Congestion Avoidance in the Internet, Braden et al., 1998, Network Working Group, Request for Comments: 2309.*

Bennett, Jon C. R., "Packet Reordering is Not Pathological Network Behavior," Dec. 1999, pp. 789-798, vol. 7, No. 6, IEEE/ACM Transactions on Networking.

Adiseshu, Hari, Parulkar, Guru and Varghese, George, "A Reliable and Scalable Striping Protocol," 11 pages, Department of Computer Science, Washington University, St. Louis, MO, "The referenced paper is to appear in *Computer Communication Review*, a publication of ACM SIGCOMM, vol. 26, No. 4, Oct. 1996. ISSN #0146-4833,"

(Continued)

*Primary Examiner*—Ricky Ngo
*Assistant Examiner*—David Oveissi
(74) *Attorney, Agent, or Firm*—Tucker Ellis & West LLP

(57) ABSTRACT

The disclosure describes queue management based on queue sets. A queue set comprises a group of packets or packet references that are processed as a single entity or unit. For example, when a queue set reaches the head of a queue in which it is stored, the entire queue set including its packets or packet references is passed for scheduling as a single unit. A queue set provides the benefit of a single operation associated with enqueuing and a single operation associated with dequeuing. Since only one operation on a queue is required for the typical case of several packets in a queue set rather than for every packet, the rate of queue operations may be significantly reduced. A queue set has a target data unit size, for example, a roughly equal number of packet bytes represented by each queue set, regardless of the number of packets referenced by a queue set. This means that a scheduler of a queue manager, which is tasked with metering the number of packet bytes transmitted from each queue per time unit, is provided with a list of packets which represents a predictable quantity of packet bytes, and this predictability streamlines the scheduling task and significantly reduces the number of operations.

16 Claims, 9 Drawing Sheets

U.S. PATENT DOCUMENTS

| | | | |
|---|---|---|---|
| 5,634,015 A * | 5/1997 | Chang et al. | 710/310 |
| 5,742,765 A * | 4/1998 | Wong et al. | 709/230 |
| 5,905,725 A | 5/1999 | Sindhu et al. | |
| 5,926,458 A * | 7/1999 | Yin | 370/230 |
| 6,160,819 A | 12/2000 | Partridge et al. | |
| 6,359,900 B1 * | 3/2002 | Dinakar et al. | 370/458 |
| 6,449,255 B1 * | 9/2002 | Waclawsky | 370/236 |
| 6,493,347 B2 * | 12/2002 | Sindhu et al. | 370/401 |
| 6,778,498 B2 * | 8/2004 | McDysan | 370/231 |
| 6,789,050 B1 * | 9/2004 | Reeser et al. | 703/2 |
| 6,810,012 B1 * | 10/2004 | Yin et al. | 370/230.1 |
| 6,826,182 B1 * | 11/2004 | Parthasarathy | 370/390 |
| 6,961,307 B1 * | 11/2005 | Aweya et al. | 370/230 |
| 7,047,312 B1 * | 5/2006 | Aweya et al. | 709/235 |
| 7,088,678 B1 * | 8/2006 | Freed et al. | 370/230 |
| 2001/0006508 A1 * | 7/2001 | Pankaj et al. | 370/232 |
| 2001/0007565 A1 * | 7/2001 | Weng et al. | 370/429 |
| 2001/0024446 A1 * | 9/2001 | Craig et al. | 370/412 |
| 2002/0044529 A1 * | 4/2002 | Giroux et al. | 370/232 |
| 2003/0112817 A1 * | 6/2003 | Woo et al. | 370/413 |
| 2003/0140196 A1 * | 7/2003 | Wolrich et al. | 711/118 |
| 2008/0002707 A1 * | 1/2008 | Davis | 370/392 |

OTHER PUBLICATIONS according to ACM SIGCOMM '96 paper retrieval site, Retrieved from the Internet Jan. 15, 2003 <http://www.acm.org/sigcomm/sigcomm96/papers/adiseshu.html>, attached.

Shreedhar, M., Varghese, G., "Efficient Fair Queuing Using Deficit Round Robin", pp. 231-242, SIGCOMM '95, Cambridge, MA, U.S.A.

D. Shah and P. Gupta, "Fast incremental updates on Ternary-CAMs for routing lookups and packet classification," in Proc. of Hot Interconnects-8, Stanford, CA, USA, Aug. 2000.

* cited by examiner

SYSTEM AND METHOD FOR QUEUE MANAGEMENT USING QUEUE SETS

CROSS-REFERENCE TO RELATED APPLICATION

This application claims the benefit of priority under 35 U.S.C. §119(e) to U.S. provisional patent application No. 60/432,518, filed on Dec. 10, 2002, entitled "System and Method for Queue Management Using Queue Sets," which is hereby incorporated by reference.

FIELD OF INVENTION

The present invention relates to queue management, particularly in a parallel packet processor in a data network.

BACKGROUND

Queuing is an important aspect of virtually all data networking equipment. This is especially so for bridges and routers that make up local area networks (LANs), metropolitan area networks (MANs), and wide area networks (WANs). Design goals for queue managers include management of a large number of queues in the face of very high network packet rates with a minimized amount of logic and memory necessary to manage the queues. Design goals seek to avoid problems such as head of line blocking and to enable features such as per-queue policing and rate shaping which enable the enforcement and delivery of specific service levels.

A queue manager schedules storage and retrieval of packet data in queues. The queue manager or a scheduler module of the queue manager is tasked with metering the number of packet bytes transmitted from each queue per time unit for achieving a certain data rate. This time unit can represent a queue service interval. As packets vary in size, the scheduler has to determine for each service interval how many of the next packets are to be serviced to satisfy the bytes/interval criteria. The number of packets and, therefore, the number of operations per interval vary, thus resulting in a variable number of operations for a given rate. Furthermore, in conventional systems, the queue manager schedules the next queue service interval to be proportional to the length of the packet just dequeued even though the next packet may significantly differ in size. This complicates the scheduling process.

In conventional systems servicing multicast packets, the scheduler performs the multicast replications thus causing undesirable head of line blocking.

It is desirable to decrease the number of operations performed by a queue manager in managing queues. For example, it is desirable, to provide a basis for scheduling the next queue service with less size variability than that achieved, for example, by the length of the packet just dequeued. It is also desirable to decrease head of line blocking at the scheduler when multicast packets are replicated.

SUMMARY OF INVENTION

The present invention overcomes the limitations discussed above by providing various embodiments of a system and a method for managing queues using on queue sets. A queue set comprises a group of packets or packet references that are processed as a single entity or unit. For example, when a queue set reaches the head of a queue in which it is stored, the entire queue set including its packets or packet references is passed for scheduling as a single unit. A queue set provides the benefit of a single operation associated with enqueuing and a single operation associated with dequeuing. A single operation for the typical case of several packets in a queue set rather than for every packet significantly reduces the rate of queue operations. In one example, queue sets for use in accordance with an embodiment of the present invention have a target data unit size, for example, a roughly equal number of packet bytes represented by each queue set, regardless of the number of packets referenced by a queue set. This means that the scheduler, which is tasked with metering the number of packet bytes transmitted from each queue per time unit, is provided with a list of packets which represents a predictable quantity of packet bytes, and this predictability streamlines the scheduling task and significantly reduces the number of operations. Other examples of advantages of the present invention include reduction in expensive on-chip storage buffers and decision speed based on the predictability of the size of a queue set and the larger size of a queue set.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
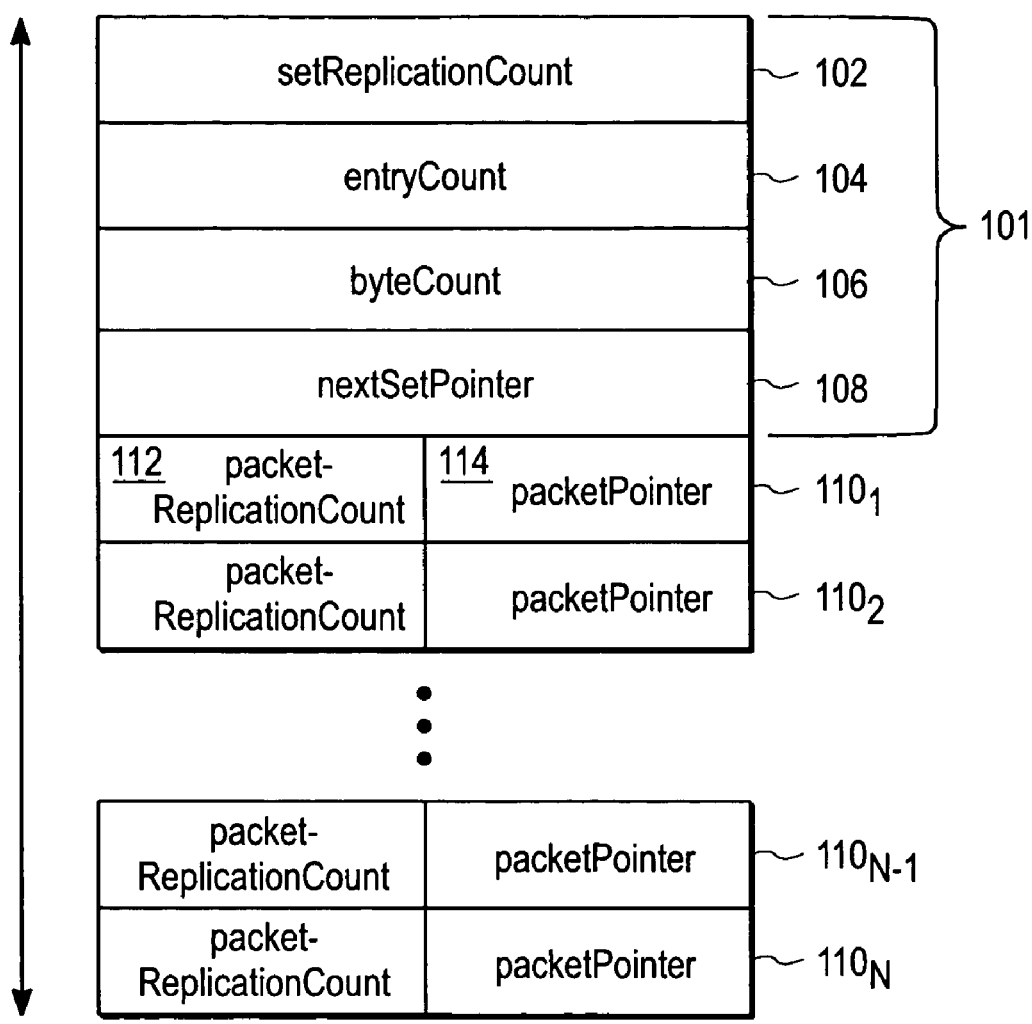
FIG. 1 illustrates an atomic data structure for representing a queue set in accordance with an embodiment of the present invention.

FIG. 1 illustrates an atomic data structure 100 for representing a queue set for use in a system or a method for managing queues using queue sets in accordance with an embodiment of the present invention. As illustrated, the queue set data structure 100 comprises a four-field header 101 and one or more two-field packet entries $110_1$, $110_2$, ... $110_{N-1}$, $110_N$. The setReplicationCount field 102 is used to specify the number of copies of the whole queue set which are to be delivered to a scheduler. For unicast packets, this field 102 is set to one.

The entryCount field 104 value indicates the number of valid packetPointer values present in the queue set. In this example, the minimum value for entryCount 104 is one and the maximum is the capacity of the queue set for a number of valid packetPointer values. In this embodiment, the size of the queue set in terms of its capacity for storing packetPointer values is fixed. However, the number of packetPointer values which are actually utilized in each queue set can vary. In another example, the capacity can be configured during system initialization.

The byteCount field 106 value indicates the total byte count of all of the packets referred to by the packetPointer values within the current queue set. This total byte count is used by the scheduler to adjust its queue service timing so as to track to the desired data rate on a per queue basis. This field is an example of a queue set size field represented in data units.

In this embodiment, a nextSetPointer field 108 value is used to form a linked list of queue set entries. By utilizing a linked list of free buffers into which queue sets may be stored, storage resources may be freely reallocated from one relatively idle queue to a relatively busy queue. In one example, the linked list of free buffers may be implemented by using a linked list based on FIFOs.

In another embodiment, a fixed-allocation FIFO-style queue implementation is used. In this manner of FIFO implementation, a single set of head and tail pointers per queue may be used to manage the FIFO. However, queue entry storage space may not be dynamically traded from one queue to another during system operation.

In the embodiment of FIG. 1, each of the two-field packet entries $110_N$ includes a packetReplicationCount field 112 and a packetPointer field 114. A packetReplicationCount field value greater than 1 is used to specify that multiple copies of the packet are to be dequeued. This field is typically used for the multicast replication of small numbers of packets in view of the availability of the setReplicationCount field 102. When packetReplicationCount is greater than one, the byte count of the associated packet is multiplied by packetReplicationCount prior to inclusion in the grand total for the queue set.

In this illustrated embodiment, each packetPointer 114 value within each queue set points to a single packet. The packetPointer 114 value may also include (or simply refer to) information regarding the length (byte count) of the associated packet, destination information and other information typically found in a packet header In the discussion of the figures below, the term "packet" can refer to the packet itself, or to a reference or pointer to the packet. Furthermore the queue set data structure embodiment illustrated in FIG. 1 can be used in any of the illustrated embodiments.

Figure 2:
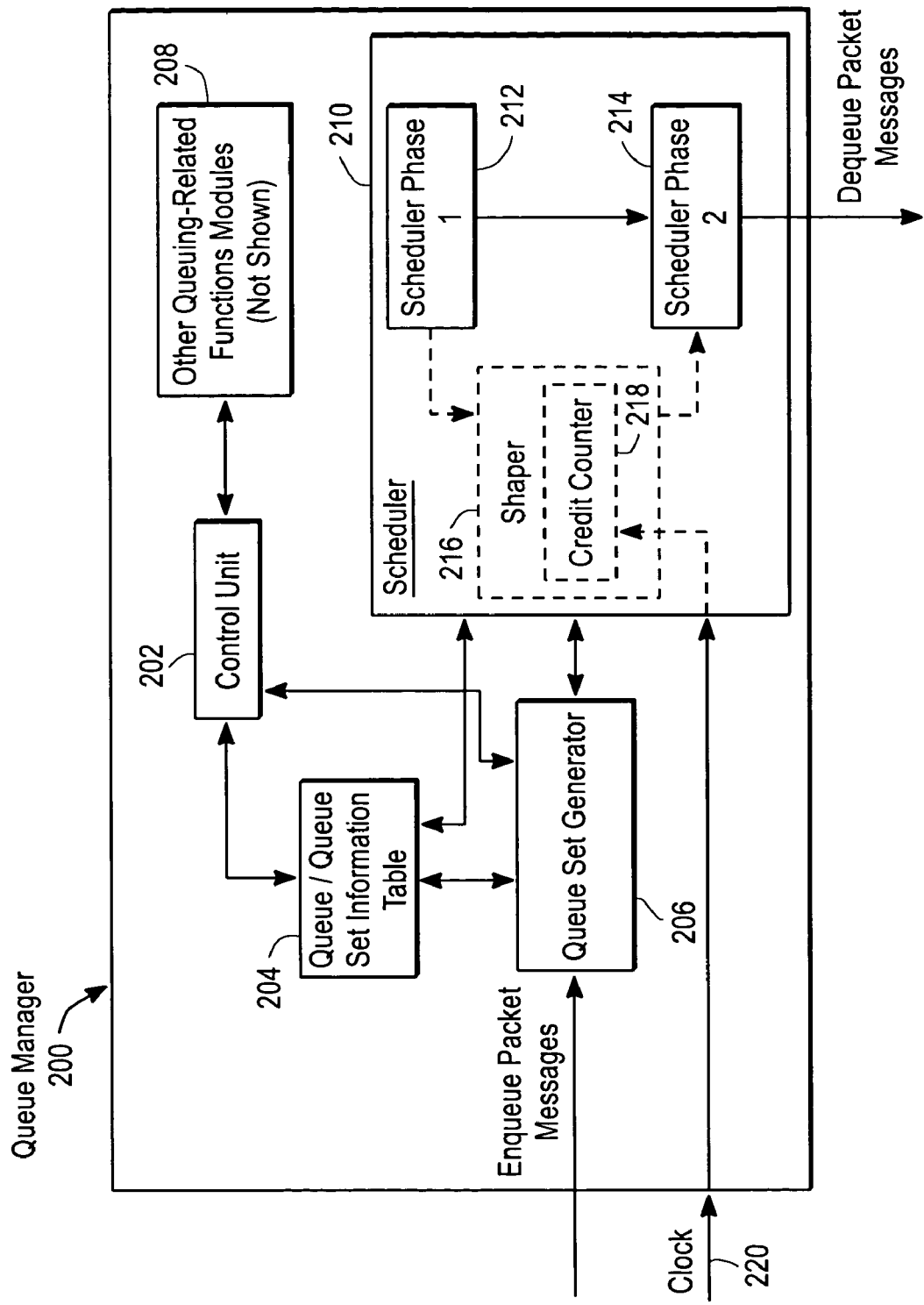
FIG. 2 illustrates a queue manager for managing queues using queue sets in accordance with an embodiment of the present invention.

FIG. 2 illustrates a system 200 for queue management using queue sets in accordance with an embodiment of the present invention. One or more of the elements shown in FIG. 2 may be implemented in software, hardware, firmware, or any combination thereof and may be stored in, for example, a computer usable medium such as a memory or in an integrated circuit. Those skilled in the art will appreciate that although the elements are depicted as individual units for illustrative purposes, the elements may also be implemented in combination.

The system in FIG. 2 is illustrated as a queue manager 200 comprising a queue set generator 206, a memory 204 storing information relating to queue sets and the queues managed by the system 200, a control unit 202, other queuing-related functions modules 208, a scheduler module 210 and a real-time clock input 220. The control unit 202 is communicatively coupled to the memory 204, the queue set generator 206, the scheduler 210, and other queuing-related function modules 208 (not shown). The control unit 202 provides management functions (e.g. error messages, monitoring, message handling) for the queue manager 200 and communicates with other units (not shown) in a packet processing system in which the queue manager 200 operates.

The queue set generator 206 is communicatively coupled to receive packet enqueuing requests or messages from a requesting entity. Examples of such an entity include a buffer manager or a network interface. The queue set generator 206 has access to the queuing related information stored in memory 204 and has communication interfaces with the control unit 202 and the scheduler 210. In this embodiment, the queue set generator 206 comprises logic for transforming the packet information in the Enqueue Packet Messages such as packets or packet references into a queue set for allocation to a queue. Examples of logic include instructions embodied in software, hardware, firmware or a combination of any of these. The queue set generator module 206 notifies the scheduler module 210 that a queue set is ready for scheduling for dequeuing.

The scheduler 210 schedules queues for servicing and is communicatively coupled to the queue set generator 206, the control unit 202, and the memory 204. In particular, the scheduler 210 schedules queues for dequeuing, for example by transmitting dequeue packet messages to an entity such as a buffer manager or a network adaptation layer in a parallel packet processing system. In one example, the scheduler schedules queues for service in accordance with a deficit round robin (DRR) scheduling algorithm. The scheduler 210 determines queue service intervals based upon the real-time clock data received through the clock input 220. In one embodiment the scheduler 210 may implement regular traffic scheduling where queues are serviced for a rate based on the flow in all the queues. An example of regular traffic shaping is that the ratio between multiple flows, when all flows are busy, is guaranteed. In regular scheduling where only the ratio between multiple flows (when all flows are busy) is guaranteed. With regular scheduling, if only a single flow is active, it may take all the line bandwidth. The scheduler 210 releases queues to achieve a data rate of a data unit per time interval. Examples of data units are bytes, cells of packet wherein the cells have a fixed or a target size, or a word.

Traffic shaping refers to the ability of a queuing and scheduling system to transmit a specific number of data units in a specified time duration. Traffic shaping is distinct from regular traffic scheduling due to the fact that when a traffic flow is shaped to a rate less than the rate supported by the physical line, the scheduling system allows the line to stay idle for some period of time if necessary to keep a flow within its configured shaped rate.

Traffic shaping is usually configured per queue—and is typically specified in units of bits or bytes per second but other data units can be specified as well. If a queue is configured to transmit a bits/second, a queuing and scheduling system ensures that no greater than a bits are transmitted every second from the queue even if there is no other traffic, and the line is capable of handling more data. A traffic shaper is also called a "non work conserving" scheduler. Having each queue set represent a roughly consistent number of packet bytes has the benefit of simplifying the scheduling operations associated with traffic shaping when employed during the dequeuing of packets.

FIG. 2 further illustrates an embodiment of a scheduler 210 that employs per-queue traffic shaping based on queue sets in accordance with an embodiment of the present invention. The scheduler 210 comprises a shaper 216 including a credit counter 218, and for illustrative purposes two logical units, a scheduler phase 1 module 212 and a scheduler phase 2 module 214. In this example, the scheduler phase 1 module 212 determines if the queue set is to be "shown" or made available to the scheduler phase 2 214. For regular (non shaped) queues, scheduler phase 1 module 212 shows all enqueued queue sets to the scheduler phase 2 214. For shaped queues, however, the scheduler phase 1 212 determines whether the queue set enqueuing rate into the queue exceeds a shaping rate for the transmission of data units/time interval from the queue. Responsive to the queue set enqueuing rate not exceeding the shaping rate, the scheduler phase 1 212 makes the queue set available to the scheduler phase 2 module 214. Responsive to the queue set enqueuing rate exceeding the shaping rate, the scheduler phase 1 module 212 transfers the queue set, for example as represented by the atomic data structure 100 in FIG. 1 to the shaper module 216. The shaper 216 is driven by the clock 220 and periodically adds "credits" to the shaped queue—for example, since the queue is shaped to a bits/second, the shaper 216 might be set up to add a/1000 "credits" to the queue each millisecond (the time granularity at which credits are added is implementation dependent). The credit counter 218 counts the added "credits" to the shaped queue based on the shaping rate for the queue (e.g., bits per second) and the real-time clock 220. The shaper 216 routinely checks the queue/queue set information table 204 which indicates a queue number and an amount of data. Based on this information and the time passage indicated by the credits accumulated, the shaper 216 releases one or more of the waiting queue sets for a queue. In one example, criteria for release of a queue set is satisfied when a queue accumulates as many credits as the target data size of a queue set, and responsively, the shaper module 216 sends a notification to the scheduler phase 2 module 214 that the queue set is available for scheduling for dequeuing.

For illustrative purposes, the method embodiments illustrated in FIGS. 3 through 8 are discussed in the context of the system embodiment 200 of FIG. 2. Furthermore, for illustrative purposes, when a queue set is referred to in the following embodiments, the queue set can be embodied in the atomic data structure illustrated in FIG. 1.

Figure 3:
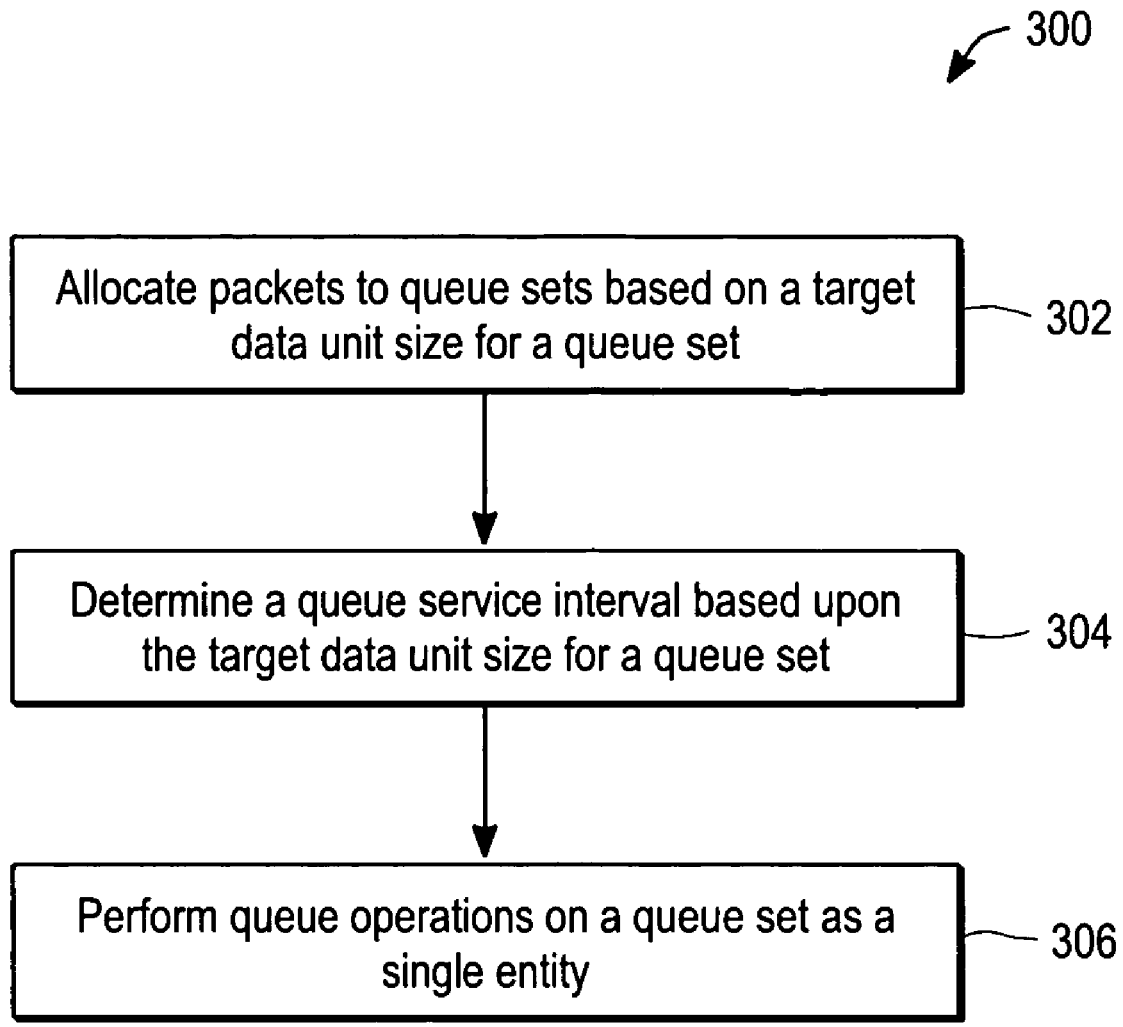
FIG. 3 illustrates a method for managing queues using queue sets in accordance with an embodiment of the present invention.

FIG. 3 illustrates a method 300 for managing queues using queue sets in accordance with an embodiment of the present invention. The queue set generator 206 allocates 302 packets to queue sets based on a target data unit size for a queue set. The scheduler 216 determines 304 a queue service interval based upon the target data unit size. The scheduler 216, for example, performs 306 queuing operations on a queue set as a single entity.

Figure 4:
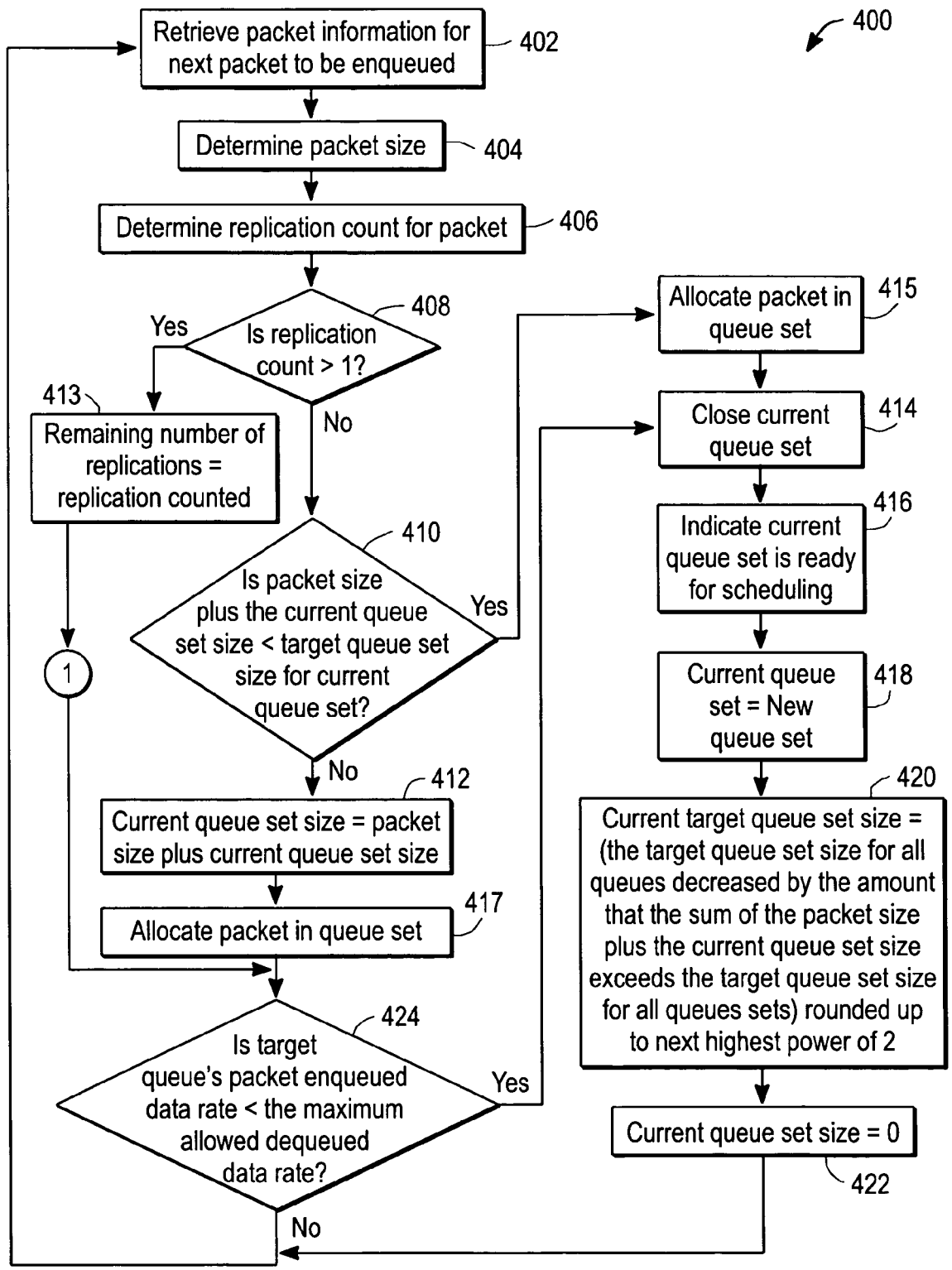
FIG. 4 illustrates a method for allocating packets to queue sets in accordance with an embodiment of the present invention.

FIG. 4 illustrates a method 400 for allocating packets to queue sets in accordance with an embodiment of the present invention. Though the size of each queue set is itself fixed in this embodiment, the number of packets referred to by a queue set and, hence, the total number of packet bytes is quite variable. However, the objective of the queue set in this embodiment is for each one to represent a nearly constant number of packet bytes. The target queue set size for all queues is nominally set to be approximately that of the largest supported packet length.

The queue set generator 206 retrieves 402 packet information for the next packet to be enqueued. The information can be obtained from enqueue packet messages. From the packet information, the queue set generator 206 determines 404 the packet size and determines 406 the replication count for the packet. The generator module 206 determines 408 whether the replication count is greater than 1. Responsive to the replication count being greater than 1, the queue set generator 206 sets 413 a remaining number of replications to the replication count and executes a path of instructions for a method 600 for processing the replication of packets or packet references within a queue using queue sets (discussed below in reference to FIG. 6). Responsive to the replication being one, the generator module 206 determines 410 whether the packet size plus the current queue set size is less than the target queue set size for the current queue set. In this example, there is a target queue set size for all the queue sets which the average of the actual sizes of the queue sets approaches. Due to the variability in the length of packets, a packet can be stored in a queue set whose size makes the queue set size greater than the target queue set size (e.g. 2048 bytes) across all the queue sets. The size of the next queue set allocated has its target set size adjusted so that the average for the queue sets is about or approximately the target queue set size for all the queues.

Responsive to the packet size plus the current queue set size not being less than the target queue set for the current queue set, the generator 206 allocates 415 the packet to the queue set, closes 414 the queue set, and indicates 416 to the scheduler 210 that the current queue set is ready for scheduling. The generator opens 418 a new queue set as the current queue set, for example by instantiating a new queue set data structure such as the one in FIG. 1. It 206 sets 420 the current target queue set size to be approximately equal to the target queue set size for all queues decreased by the amount that the sum of the packet size plus the current queue set size exceeded the target queue set size for all queues sets. In this example, the current target queue set size is rounded up to the next highest power of 2 for ease of implementation with standard memory sizes. The generator 206 initiates 422 the current queue set size to 0.

Responsive to the packet size plus the current queue set size being less than the target queue set for the current queue set, the generator 206 increases 412 the current queue set size by the packet size. The generator 206 allocates 417 the packet to the queue set. The generator 206 determines 424 whether the target queue for this queue set has an enqueue data rate less than the maximum allowed dequeue data rate. The associated queue could be empty and needs to be serviced by the scheduler. The queue set can be immediately closed and any further queue entries directed at the queue are placed into subsequent queue sets. Responsive to an affirmative determination, the generator closes 414 the current queue set, indicates 416 that it is ready for scheduling, and proceeds with the processing 418, 420, 422 for opening the next queue set. Responsive to a negative determination, the queue set generator retrieves 402 packet information for the next packet to be enqueued, and repeats the method 400.

Figure 5:
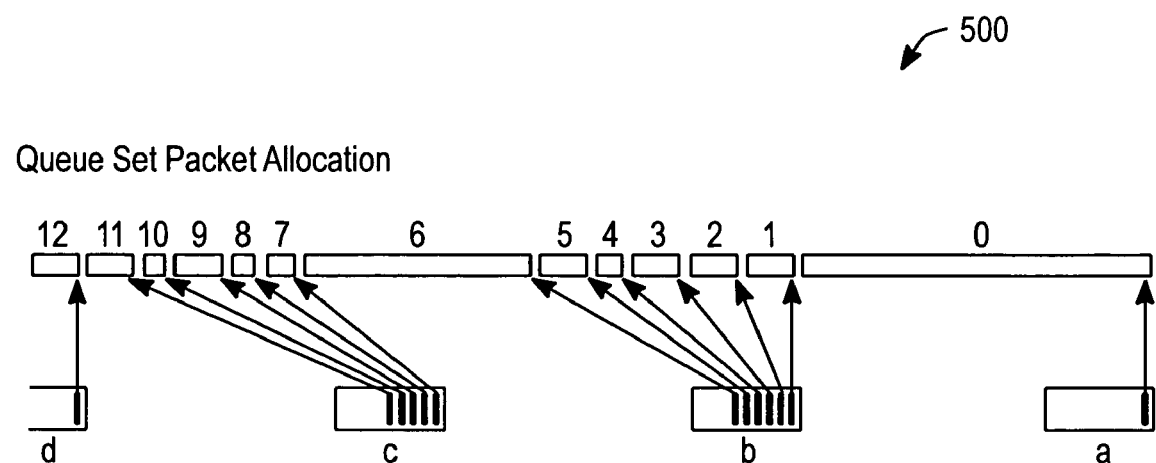
FIG. 5 illustrates an example of allocating packets to queue sets in accordance with the method embodiment of FIG. 4.

FIG. 5 illustrates an example of allocating packets to queue sets in accordance with the method embodiment of FIG. 4. In the illustrated example of FIG. 5, a queue set is considered full when the total number of packet bytes referred to by the queue set meets or exceeds the target byte count. In the example, packet 0 fills queue set a completely. Queue set b is able to accommodate packets 1 through 6 before filling. Actually, queue set b exceeds the target byte count, resulting in an adjustment to be carried over to queue set c. Due to the excess of bytes in queue set b, the target byte count for queue set c is reduced so that the average queue set size remains close to the target size. The carrying over of excess byte counts to subsequent queue sets is an optional feature of the present invention.

Figure 6:
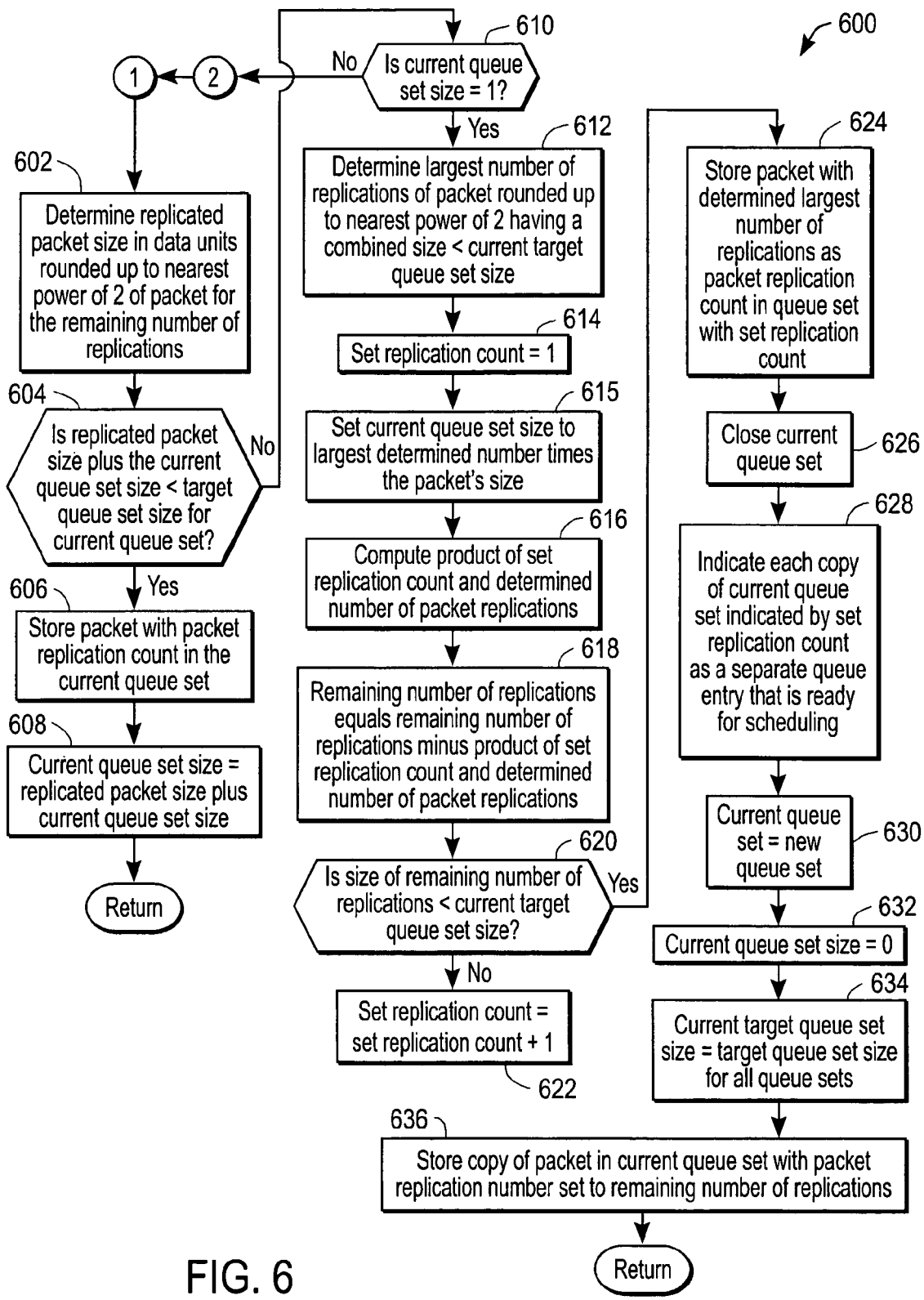
FIG. 6 illustrates a method for processing the replication of packets or packet references within a queue using queue sets in accordance with an embodiment of the present invention.

FIG. 6 illustrates a method 600 for processing the replication of packets or packet references within a queue using queue sets in accordance with an embodiment of the present invention. Queue managers in packet processors typically have to deal with replication of a packet multicast to multiple destinations. Within a networking system or device, packets may need to be replicated both before and after enqueuing. When a packet is replicated before enqueuing, copies of the packet are deposited into multiple queues and/or multiple copies of a packet are deposited into a single queue. When a packet is replicated after dequeuing, a packet read from a queue is replicated prior to transmission. In the embodiment of FIG. 6, a packet and its replication count are stored in a queue set. Alternatively, copies of the packet itself may be stored in the queue sets so that the replication is performed before enqueuing.

Responsive to the determination 408 that the replication count for a packet is greater than 1, the generator determines 602 the replicated packet size in data units (e.g. bytes) rounded up to the nearest power of 2 for the remaining number of replications. In other words, the size of all the remaining replications of this packet together is determined. The generator 206 determines 604 whether the replicated packet size plus the current queue set size is less than the target queue set size for the current queue set. Responsive to an affirmative determination, the generator 206 stores 606 the packet with its packet replication count in the current queue set. The generator 206 updates 608 the current queue set size to equal the replicated packet size plus the current queue set size and execution returns to the determination 424 for early closure of the queue set due to a queue needing immediate service.

Responsive to a negative determination, the generator determines 610 whether the current queue set is empty, meaning its current queue set size=0 data units. Responsive to an affirmative determination, the generator 206 determines 612 the largest number of replications of the packet rounded up to the nearest power of 2 having a combined size less than the current target queue set size. The generator 206 sets 614 the replication count for the queue set equal to 1 and sets 615 the current queue set size to the product of the largest determined number times the packet size. The generator 206 computes 616 the product of the set replication count and the determined largest number. The remaining number of replications is set 618 to be the remaining number of replications minus the product of set replication count and the determined largest number of packet replications. The generator 206 determines 620 whether the size of the remaining number of replications is less than the current target queue set size. Responsive to a negative determination, the set replication count is incremented 622 by 1, in this example, by the generator 206, and the processing of computing 616 the product of the set replication count and the determined largest number of packet replications, adjusting 618 the remaining number of replications in view of that computation, the determination 620 whether the size of the remaining number of replications still exceeds a queue set size, and the incrementing 622 of the set replication count are repeated until the determination 620 is an affirmative one. Responsive to the affirmative determination, the generator 206 stores 624 a copy of the packet with its packet replication count set to the largest number of determined replications and the set replication count for the queue set equal to the last updated set replication count. The generator 206 closes 622 or enqueues the current queue set. The generator 206 indicates 628 each copy of the current queue set as determined by the set replication count as a queue set entry ready for scheduling to the scheduler 210. In this way head of line block is reduced as the scheduler is presented with each of the replicated copies, and a larger set of packet data is dealt with in a single dequeuing operation than when individual packets are replicated. As each copy is presented to the scheduler, the set replication count is decremented by 1 until it reaches 0, and the queue set is discarded. In one embodiment, the scheduler 210 manages the counting of the packet replications as they tend to be small in number using the method embodiment described above.

The queue set generator 206 makes a new queue set 630 the current queue set, and makes 632 the current queue set size zero. The current target queue set size is set 634 to that of the target queue set size for all queue sets. The generator stores 636 a copy of the packet in this current queue set with a packet replication count set to the remaining number of replications. The queue set generator returns to the determination 424 for early closure of the queue set due to a queue needing immediately service. The method embodiment of FIG. 6 accounts for replications in order to maintain queue sets at about the target queue set data unit size.

Figure 7:
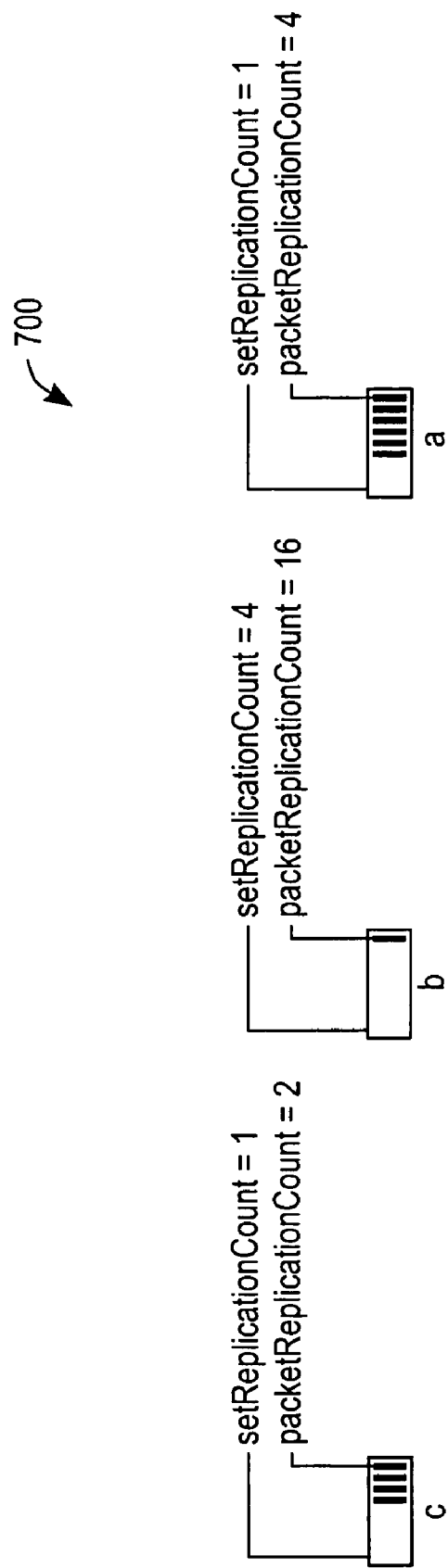
FIG. 7 illustrates an example of processing the replication of packets or packet references within a queue using queue sets in accordance with the method embodiment of FIG. 6.

FIG. 7 illustrates an example of a method 700 for processing the replication of packets or packet references within a queue using queue sets in accordance with an embodiment of the present invention. As in the example of FIG. 1, each queue set includes a replication count value which applies equally to all packets included in the queue set's packet list. Additionally, each packet listed within a queue set has its own packet-specific replication value included as part of the packet descriptor. With proper use, these counters make it possible to replicate a packet an arbitrary number of times while maintaining the target size concept of a queue set. In the illustrated example, no more than three copies of a packet reference is actually deposited into the destination queue.

In the example shown in FIG. 7, the following conditions exist:

1. The target queue set size is 2K bytes.
2. Queue set a already contains five packet references totaling 1.5K bytes.
3. 70 copies of a packet 128 bytes in length need to be enqueued.

Additionally, for this example, each queue set comprises the data structure shown in FIG. 1.

Since the first queue set only has room for references to 512 bytes of packet data available, a single reference to the multicast packet with a packetReplicationCount value of 4 is added; closing out queue set a.

Queue set b is filled to its 2K byte capacity as nearly as possible. In this example it takes 16 copies of the 128-byte multicast packet to do so. Hence, a packetReplicationCount value of 16 is associated with the packetPointer field of the sole entry in the queue set.

In this example, the setReplicationCount for queue set b is set to as large a value as possible without going over the replication requirement of 70 copies. This yields a setReplicationCount value of 4; meaning that queue set b is delivered to the scheduler four times as if it were four distinct entries in the queue. The number of packet copies implied by queue set b is the product of setReplicationCount and packetReplicationCount: 4×16=64.

Two more copies of the packet must be provided. Hence, queue set c starts off with a single reference to the multicast packet with a packetReplicationCount value of 2; bringing the grand total to 70.

Figure 8:
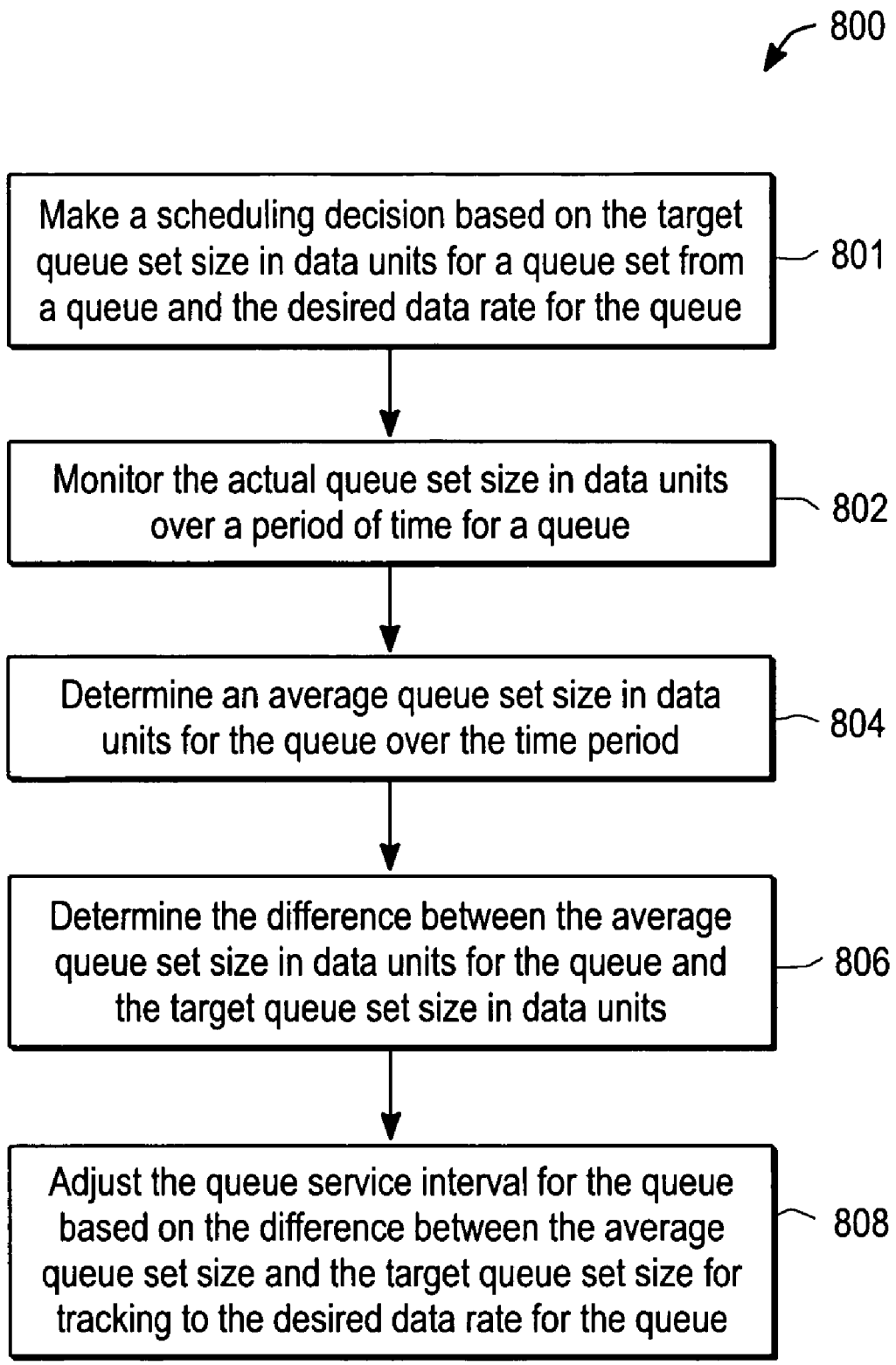
FIG. 8 illustrates a method for adjusting queue service timing based on queue sets for tracking to a desired data rate in accordance with an embodiment of the present invention.

FIG. 8 illustrates a method for adjusting queue service timing based on queue sets for tracking to a desired data rate in accordance with an embodiment of the present invention. The scheduler 210 makes 801 a scheduling decision based on the target queue set size in data units for a queue set from a queue and the desired data rate for the queue. The scheduler 210 monitors the actual queue set size in data units over a period of time for a queue. For example, it 210 can read byteCount 106 when the atomic queue set data structure of FIG. 1 represents the queue set. The scheduler 210 determines 804 an average queue set size in data units for the queue over the time period. The scheduler 210 determines 806 the difference between the average queue set size in data units for the queue and the target queue set size in data units and adjusts 808 the queue service interval for the queue based on the difference between the average queue set size and the target queue set size for tracking to the desired data rate for the queue.

The use of queue sets makes the scheduler 210 adjust its future decision making based on the actual (versus anticipated) number of data units (e.g., bytes) in each queue set practical. In practice this approach fails when the entities being scheduled are individual packets because the variability in size is so high (i.e. 40 Byte minimum to 16,384 Bytes maximum are typical numbers). While the variability in size of individual packets is very high (i.e. 40 bytes minimum to 16,384 bytes maximum are typical numbers), the relatively predictable size of the queue set allows adjustments in the target size to be smaller than the target size itself which in turn makes the whole process more efficient.

Figure 9:
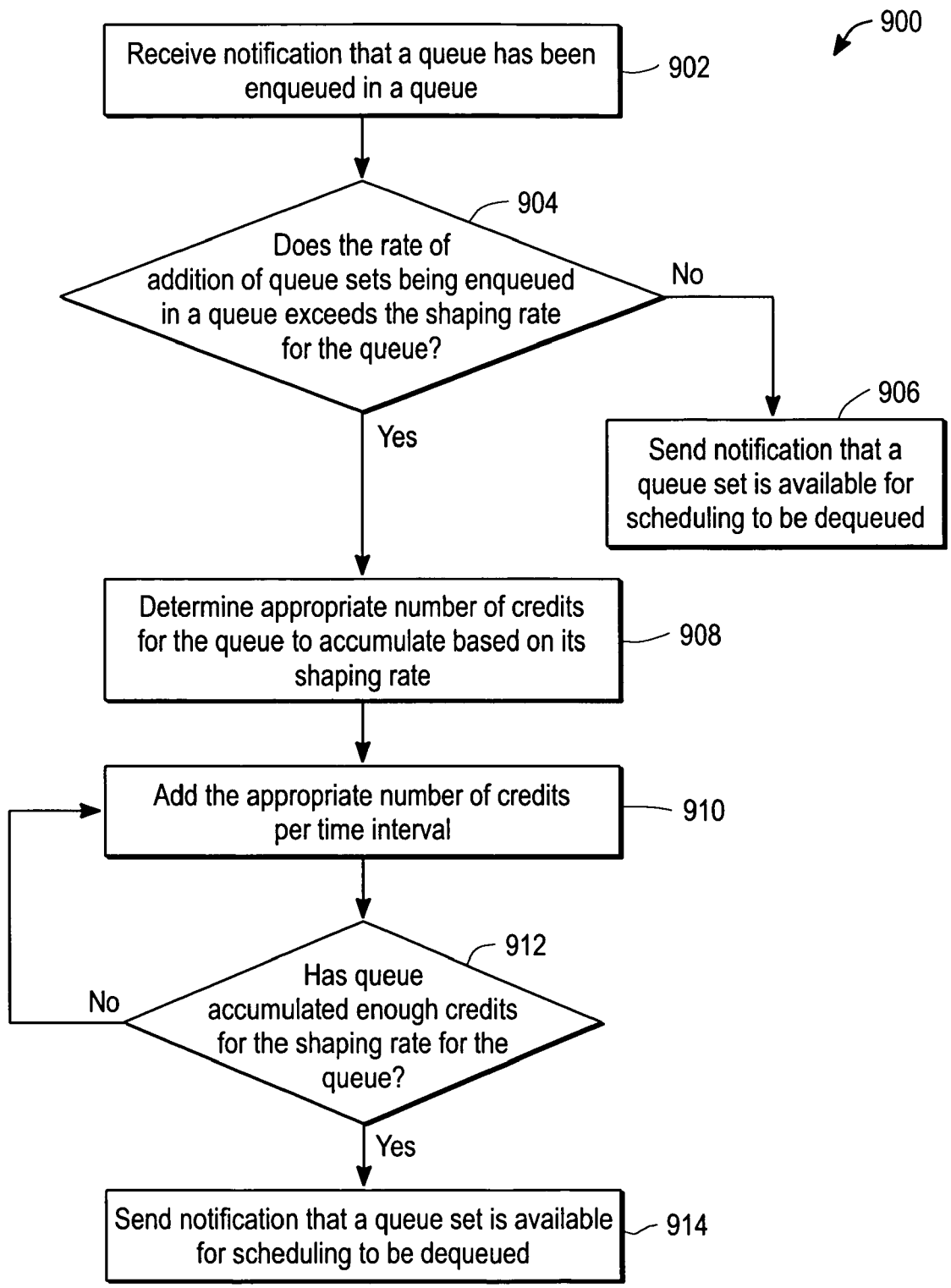
FIG. 9 illustrates a method for shaping traffic flow of queue sets for a queue at a rate in accordance with an embodiment of the present invention.

FIG. 9 illustrates a method for shaping traffic flow of queue sets for a queue at a rate in accordance with an embodiment of the present invention. The scheduler phase 1 212 receives 902 a notification that a queue set has been enqueued in a queue. The scheduler phase 1 212 determines 904 whether the rate of addition of queue sets being enqueued in a queue exceeds the shaping rate for the queue. Responsive to the shaping rate not being exceeded by the addition rate, the scheduler phase 1 212 sends 906 a notification that a queue set is available for scheduling to be dequeued. Responsive to the shaping rate being exceeded, the scheduler phase 1 forwards the queue set information, for example in the form of the queue set data structure 100, to the shaper 216. The shaper 216 determines 908 the appropriate number of credits for the queue to accumulate based on its shaping rate. The shaper 216 adds 910 the appropriate number of credits per time interval. In the example of FIG. 2, the credit counter 218 tracks the accumulation of the credits. The shaper 216 determines 912 whether or tracks when the queue has accumulated enough credits for the shaping rate for the queue for example based on a message received from the credit counter 218. Responsive to still more credits needing to be added, the addition 910 of credits continue. Responsive to enough credits having been accumulated, the shaper 216 sends 914 a notification that a queue set is available for scheduling to be dequeued.

It should be understood by those of ordinary skill in the art that these examples have been presented by way of example only, and not limitation. Though the examples herein are described in certain specific examples regarding bandwidths, storage capacities and the like, it will be apparent to those of ordinary skill in the art in light of the teachings herein that each of these parameters may be readily scaled up or down and still remain consistent with the description. It will be understood by those of ordinary skill in the relevant art that various changes in form and the details of the examples described above may be made without departing from the spirit and scope of the present invention.

The invention claimed is:

1. A method for managing a queue of packets using queue set data structures, the method comprising:
    transforming a plurality of consecutive packets into a queue set data structure based on a target queue set data structure size, the plurality of consecutive packets being associated with the queue, wherein the plurality of consecutive packets comprises a first packet having a first packet size and a second packet having a second packet size;
    performing a queuing operation on the queue set data structure, the queuing operation treating the queue set data structure as a single entity, and the queuing operation being performed on each of the plurality of consecutive packets in the queue set data structure; and
    determining whether transforming a third consecutive packet into the queue set data structure results in the sum of the packet sizes exceeding the target queue set data structure size; and
    responsive to determining the sum exceeds the target queue set data structure size:
    closing the queue set data structure;
    initiating a new queue set data structure; and
    adjusting a target queue set data structure size allocated for the new queue set data structure based upon an amount the sum of the packet sizes exceeds the target queue set data structure size,
    wherein performing the queuing operation further comprises shaping traffic flow of the queue set data structure at a rate for transmission of data from the queue.

2. The method of claim 1, wherein transforming the plurality of consecutive packets into the queue set data structure further comprises:
    determining a size of each of the plurality of consecutive packets;
    allocating the plurality of consecutive packets to the queue set data structure based on a target queue set data structure size according to the consecutive packet sizes, the target queue set data structure size being approximate to a largest supported packet length of the queue.

3. The method of claim 1, further comprising:
    determining a queue service interval for performing queuing operations on queue sets data structures based upon a desired data rate and a target queue set data structure size;
    wherein performing the queuing operation on the queue set data structure related to the queue further comprises:
    performing a first queuing operation on a first queue set data structure related to the queue,
    delaying a period of time equivalent to the queue service interval, and
        performing a subsequent queuing operation on a second queue set structure related to the queue.

4. The method of claim 3, wherein determining the queue service interval further comprises:
    determining an average queue set data structure size for the queue sets data structures over a period of time; and
    adjusting the queue service interval based upon a difference between the average queue set data structure size and the target queue set data structure size.

5. The method of claim 1, wherein the queuing operation comprises at least one selected from a group consisting of: enqueue operation and dequeue operation.

6. The method of claim 1, further comprising:
- determining that each queue set data structure of a plurality of consecutive queue sets data structures is the same;
- using one representative queue set data structure to represent the plurality of consecutive queue sets data structures, a replication count of the queue set data structure being equivalent to the number of queue sets data structures in the plurality of consecutive queue sets data structures; and
- performing a queuing operation on the representative queue set data structure, and the queuing operation being performed on each of the plurality of consecutive queue sets data structures.

7. A system for queue management using queue sets data structures, comprising:
- a queue set data structure generator configured for transforming a plurality of consecutive packets into a queue set data structure based on a target queue set data structure size, the plurality of consecutive packets being associated with a queue, wherein the plurality of consecutive packets comprise a first packet having a first packet size and a second packet having a second packet size, the queue set data structure generator further configured for generating a notification when a queue set data structure is ready for scheduling; and
- a scheduler communicatively coupled to the queue set data structure generator to receive the notification, the scheduler configured for performing a queuing operation on the queue set data structure, the queuing operation treating the queue set structure as a single entity, and the queuing operation being performed on each of the plurality of consecutive packets in the queue set data structure;
- wherein the scheduler is further configured for determining a queue service interval for performing queuing operations on queue sets data structures based upon a desired data rate and a target queue set data structure size, performing a first queuing operation on a first queue set data structure related to the queue, delaying a period of time equivalent to the queue service interval, and performing a subsequent queuing operation on a second queue set data structure related to the queue; and
- wherein the scheduler is further configured for determining an average queue set data structure size for the queue sets data structures over a period of time, and adjusting the queue service interval based upon a difference between the average queue set data structure size and the target queue set data structure size.

8. The system of claim 7, wherein the queue set data structure generator is further configured for:
- determining a size of each of the plurality of consecutive packets: and
- allocating the plurality of consecutive packets to the queue set data structure based on a target queue set data structure size according to the consecutive packet sizes, the target queue set data structure size being approximate to a largest supported packet length of the queue.

9. The system of claim 7, wherein the scheduler is further configured for shaping traffic flow of the queue set data structure at a rate for transmission of data from the queue.

10. The system of claim 7, wherein the queuing operation comprises at least one selected from a group consisting of: enqueue operation and dequeue operation.

11. The system of claim 7, wherein the queue set data structure generator is further configured for determining that each queue set data structure of a plurality of consecutive queue sets data structures is the same, and using one representative queue set data structure to represent the plurality of consecutive queue sets data structures, a replication count of the queue set data structure being equivalent to the number of queue sets data structures in the plurality of consecutive queue sets data structures, and wherein the scheduler is further configured for performing a queuing operation on the representative queue set data structure, and the queuing operation being performed on each of the plurality of consecutive queue sets.

12. The method of claim 1, wherein at least one of the plurality of consecutive packets is a multicast packet, further comprising:
- determining a number of times the multicast packet is to be replicated;
- determining a first number of copies, the first number of copies representing how many copies of the multicast packet can be processed by a first queue;
- inserting data into the queue set data structure indicating the multicast packet is to be replicated the first number of times in the first queue;
- determining a remaining number of times the multicast packet is to be replicated; and
- generating a second queue set data structure for a second queue, the second queue set data structure comprising a number of times the packet is to be replicated within the second queue set data structure and a number of times the second queue set data structure is to be replicated;
- wherein a product of the number of times the packet is to be replicated within the second queue set data structure and the number of times the second queue set data structure is to be replicated is not greater than the remaining number of times the multicast packet is to be replicated.

13. The method of claim 1, further comprising adjusting a target queue set data structure size allocated for a next queue set data structure so that the average of the queue sets is approximately target queue set size.

14. The method of claim 1, the performing a queuing operation on the queue set data structure further comprises:
- determining a first replication count for the first packet;
- determining a second replication count for the first packet;
- replicating the first packet corresponding to the first replication count; and
- replicating the second packet corresponding to the second replication count;
- wherein one of a group consisting of the first replication count and second replication.

15. A method for managing a queue of packets using queue set data structures, the method comprising:
- transforming a plurality of consecutive packets into a queue set data structure based on a target queue set data structure size, the plurality of consecutive packets being associated with the queue, wherein the plurality of consecutive packets comprises a first packet having a first packet size and a second packet having a second packet size;
- performing a queuing operation on the queue set data structure, the queuing operation treating the queue set data structure as a single entity, and the queuing operation being performed on each of the plurality of consecutive packets in the queue set data structure; and
- adjusting a target queue set data structure size allocated for a next queue set data structure so that the average of the queue sets is approximately target queue set size.

16. The method of claim 15, wherein at least one of the plurality of consecutive packets is a multicast packet, further comprising:

determining a number of times the multicast packet is to be replicated;

determining a first number of copies, the first number of copies representing how many copies of the multicast packet can be processed by a first queue;

inserting data into the queue set data structure indicating the multicast packet is to be replicated the first number of times in the first queue;

determining a remaining number of times the multicast packet is to be replicated; and generating a second queue set data structure for a second queue, the second queue set data structure comprising a number of times the packet is to be replicated within the second queue set data structure and a number of times the second queue set data structure is to be replicated;

wherein a product of the number of times the packet is to be replicated within the second queue set data structure and the number of times the second queue set data structure is to be replicated is not greater than the remaining number of times the multicast packet is to be replicated.

* * * * *